(12) United States Patent
Saracco (10) Patent No.: US 6,684,215 B1
(45) Date of Patent: Jan. 27, 2004

(54) TECHNIQUE FOR ENFORCING TEMPORAL UNIQUENESS IN AN OBJECT/RELATIONAL DATABASE MANAGEMENT SYSTEM ENVIRONMENT

(75) Inventor: Cynthia Maro Saracco, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 09/597,588

(22) Filed: Jun. 20, 2000

(51) Int. Cl.[7] .............................. G06F 7/00; G06F 17/00
(52) U.S. Cl. .................. 707/100; 707/103 Y; 707/203; 713/161; 713/200; 713/201
(58) Field of Search ................................. 707/100, 102, 707/103 Y, 203; 340/870.03; 710/20; 713/161, 200, 201

(56) References Cited

U.S. PATENT DOCUMENTS

| | | | | |
|---|---|---|---|---|
| 4,947,320 A | * | 8/1990 | Crus et al. ................... | 707/201 |
| RE34,954 E | | 5/1995 | Haber et al. .................. | 380/69 |
| 5,440,730 A | * | 8/1995 | Elmasri et al. ............. | 707/203 |
| 5,566,349 A | * | 10/1996 | Trout ........................... | 710/20 |
| 5,717,879 A | | 2/1998 | Moran et al. ................ | 395/339 |
| 5,940,825 A | | 8/1999 | Castelli et al. ................. | 707/6 |
| 6,199,068 B1 | * | 3/2001 | Carpenter .............. | 340/870.03 |
| 6,233,573 B1 | * | 5/2001 | Bair et al. ...................... | 707/3 |

OTHER PUBLICATIONS

Ramez Elmasri and Shamkant B. Navathe, "Fundamentals of Database Systems", 1989, The Benjamin/Cummings Publishing Company, Inc., pp. 15–16 and 42–45.*

* cited by examiner

*Primary Examiner*—Safet Metjahic
*Assistant Examiner*—Hanh Thai
(74) *Attorney, Agent, or Firm*—Sandra M. Parker, Esq.

(57) ABSTRACT

A system, method and program extender for enforcing the uniqueness of temporal data in an object/relational database management system is provided. There is a combination of user-defined functions, triggers and specified conditions to determine if attempts to insert new data or update existing data in a data object in which temporal integrity is a consideration are valid. Barriers exist to protect against inserts or updates that would violate the temporal integrity of the existing data. Also included are ways for a user to modify the behavior of the system or method to override triggers for cases in which temporal integrity is not desired.

33 Claims, 5 Drawing Sheets

FIG. 1

| OPERATORS | NOTATION |
|---|---|
| BEFORE | X BEFORE Y |
| MEETS | X MEETS Y |
| OVERLAPS | X OVERLAPS Y |
| DURING | X DURING Y |
| STARTS | X STARTS Y |
| FINSIHES | X FINISHES Y |
| EQUAL | X EQUAL Y |

FIG. 2

WITHIN(date, date, date, date) returns int

3(A)

SHARES(date, date, date, date) returns int

3(B)

INTERSECT_START(date, date, date, date) returns date

3(C)

INTERSECT_END(date, date, date, date) returns date

3(D)

UNION_START(date, date, date, date) returns date

3(E)

UNION_END(date, date, date, date) returns date

3(F)

INTERSECT(date, date, date, date) returns table (c1 date, c2 date)

3(G)

UNION(date, date, date, date) returns table (c1 date, c2 date)

UPDATE WHERE N.S < O.S AND N.E = O.E

```
.<- - - - .   ------------------.
n.s    o.s              n.e
                        o.e
```
SQLSTATE error 70001 raised if updated row shares a time component with existing rows

4(A)

UPDATE WHERE N.S = O.S AND N.E > O.E

```
    .------------------.  - - - - ->.
n.s                    o.e         n.e
o.s
```
SQLSTATE error 70002 raised if updated row shares a time component with existing rows

4(B)

UPDATE WHERE N.S < O.S AND N.E > O.E

```
.<- - - - .  ------------------ .  - - - - ->.
n.s       o.s                   o.e          n.e
```
SQLSTATE error 70003 raised if updated row shares a time component with existing rows

4(C)

UPDATE WHERE N.S < O.S AND N.E < O.E AND N.E > O.S

```
            o.s              o.e
            .------------------.
   .------------------.
   n.s              n.e
```
SQLSTATE error 70004 raised if updated row shares a time component with existing rows

UPDATE WHERE N.S > O.S AND N.E > O.E AND N.S < O.E

SQLSTATE error 70005 raised if updated row shares a time component with existing rows

5(A)

UPDATE WHERE N.S < O.S AND N.E < O.E AND N.E <= O.S

SQLSTATE error 70006 raised if updated row shares a time component with existing rows

5(B)

UPDATE WHERE N.S > O.S AND N.E > O.E AND N.S >= O.E

SQLSTATE error 70007 raised if updated row shares a time component with existing rows

TECHNIQUE FOR ENFORCING TEMPORAL UNIQUENESS IN AN OBJECT/RELATIONAL DATABASE MANAGEMENT SYSTEM ENVIRONMENT

BACKGROUND OF THE INVENTION

1. Field of the Invention

This invention relates in general to database management systems performed by computers. In particular, it concerns a technique for enforcing temporal uniqueness in an object or relational database management system environment.

2. Description of Related Art

Databases are computerized information storage and retrieval systems. An Object Relational Database Management System (ORDBMS) is a database management system (DBMS) which uses relational techniques for storing and retrieving objects. These databases are organized into tables which consist of rows and columns of objects, or data. A database will typically have many tables and each table will typically have multiple rows and columns.

ORDBMS software using a Structured Query Language (SQL) interface is well known in the art. The SQL interface has evolved into a standard language for RDBMS software. SQL has been adopted as such by both the American National Standards Organization (ANSI) and the International Standards Organization (ISO).

All data in ORDBMS software is externally structured into tables. The SQL interface allows users to formulate relational operations on tables. This can be done either interactively, in batch files, or embedded in host language, such as C, COBOL, .etc. Operators are provided in SQL that allow the user to manipulate the data. The power of SQL lies in its ability to link information from multiple tables or views together to perform complex sets of procedures with a single statement.

Temporal data is often used to track the period of time at which certain business conditions are valid. Several common forms of data analysis involve evaluating time-related data. Examples are examining customer buying behavior, assessing the effectiveness of marketing campaigns, and determining the impact of organizational changes on sales during a selected time period.

It is often desirable when working with temporal data to ensure integrity for time periods in which conditions will be valid. Unfortunately, conventional techniques used to support uniqueness of non-temporal data fail to work when temporal data is involved. This is because they do not include software needed for verifying and enforcing the temporal uniqueness constraint. For example, a firm may wish to have its DBMS enforce the temporal uniqueness constraint so that "employees cannot earn multiple salaries during the same period of time" or "departments can only report to one division during any given period of time."

In non-temporal DBMS environments, data uniqueness is often guaranteed by defining one or more columns to serve as the primary key and/or defining a unique index on the appropriate columns. However, because commercial object or relational DBMS do not understand the underlying semantics of temporal data, these techniques cannot enforce temporal uniqueness. Thus, data that is considered invalid from a business point of view can be readily stored in a DBMS environment without error. This would violate the integrity rules that a firm may wish to enforce and render subsequent analysis of its data misleading or useless.

While there have been various techniques developed for enforcing temporal uniqueness in a DBMS environment, there is a need in the art for an approach which is cost-effective for vendors to implement and that integrates easily into existing object or relational DBMS environments of customers.

SUMMARY OF THE INVENTION

The foregoing and other objects, features, and advantages of the present invention will be apparent from the following detailed description of the preferred embodiments, which makes reference to several figures.

The present invention enforces temporal integrity for valid time data. The technique consists of implementing user-defined functions with templates for triggers and setting constraints to dictate the conditions for the temporal data. Together, these support many forms of temporal analysis and help enforce the fundamental aspects of temporal integrity. Among these aspects are temporal uniqueness, which refers to data that is time period exclusive.

The present invention ensures the integrity of temporal data in object or relational database management systems. Temporal and non-temporal data are organized into data objects in databases, each data object comprised of at least one row and at least one column. A data object may also be a table containing data. When a user attempts to insert new data into a data object in which temporal uniqueness is a consideration, or when a user attempts to update existing data in a data object in which temporal uniqueness is a consideration, the present invention operates to provide a barrier against inserts or updates that would violate the temporal integrity of the existing data.

All functions include error-checking logic to verify that the start and end points of a time period constitute a valid time period. For example, if the database uses dates to track temporal data and employs a "closed, open" temporal representation, start dates should be less than end dates. Such error-checking logic is built into the functions. However, to avoid populating temporal tables with invalid time periods, it is recommended that CHECK constraints be defined on relevant time-related columns (such as columns that contain date information).

The present invention helps users enforce temporal uniqueness by providing trigger templates and CHECK constraints.. One preferred embodiment includes a combination of CHECK constraints and triggers. Since determining the correct logic to implement and successfully code this logic can be a rather challenging and error-prone experience for many users, the present invention simplifies the process by providing templates in a sample database. By substituting appropriate table and column names for those provided with the sample database, users can easily instruct the DBMS to enforce temporal uniqueness for those tables in which they deem such a constraint to be important.

The present invention may also be packaged as a DBMS system extender. The extender may be provided to users of ORDBMS systems desiring to enforce temporal integrity of data within their system environments.

BRIEF DESCRIPTION OF THE DRAWINGS

FIGS. 3(A) through 3(F) are scalar user-defined functions, while FIGS. 3(G) and 3(H) are table user-defined functions;

DETAILED DESCRIPTION OF THE PREFERRED EMBODIMENTS

In the following description of the preferred embodiments reference is made to the accompanying drawings which form the part thereof, and in which are shown by way of illustration specific embodiments in which the invention may be practiced. It is to be understood that other embodiments may be utilized and structural and functional changes may be made without departing from the scope of the present invention.

The present invention discloses a system, method and extender for enforcing temporal data integrity in object or relational database management system environments. The preferred embodiments of the present invention relate in general to database management systems performed by computers, and in particular to a technique for enforcing temporal uniqueness in an object or relational DBMS environment. The present invention provides a trigger-based solution which is a relatively inexpensive development alternative. It affords the user complete control over deployment, and allows users to customize any action taken automatically by the DBMS. It is based on a combination of trigger-based logic, user-defined functions, and a routine to implement CHECK constraints.

This approach provides users with maximum flexibility by enabling them to determine which tables, if any, should be the subject of temporal uniqueness constraints. Users may also customize DBMS actions to be taken if a violation is detected, and inspect SQLSTATE errors to determine the exact nature of the condition that would cause a temporal integrity violation to occur, so that subsequent modifications can be made to avoid the problem in the future.

It should be noted that although many descriptions of this invention contained herein refer to temporal data in terms of dates or points in time, other units of measure, or other levels of temporal granularity, can be supported. These include but are not limited to more precise units of measure, such as timestamps, as well as less precise units of measure, such as data based on quarterly or annual information. However, since date-level granularity is arguably easier to understand and is the preferred form of temporal granularity for many business applications, it is a preferred embodiment of this invention and is frequently used to explain subsequent details about this invention.

Figure 1:
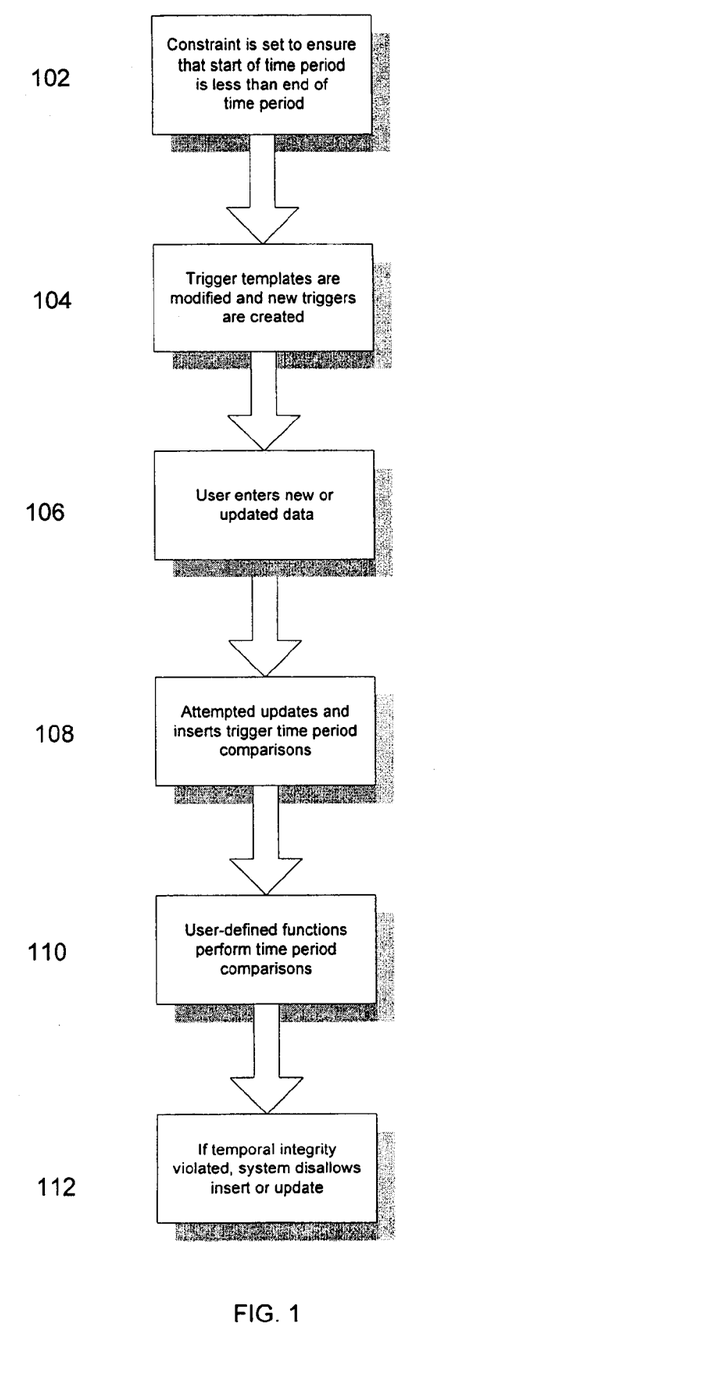
FIG. 1 illustrates a block diagram overview of the system for enforcing integrity of temporal data usable in the present invention.

FIG. 1 shows a block diagram representation of one preferred embodiment of the present invention. Referring to FIG. 1, a user of the system provides a condition that the time period start dates must be less than the time period end dates. This is shown in Block 102. The user also provides a set of routines to verify that additions or changes to the data object will not violate temporal uniqueness. This is shown in Block 104. Block 102 may be accomplished using a user-defined CHECK constraint providing the initial condition that temporal integrity is to be preserved. Block 104 may be accomplished by using the trigger templates provided as part of the invention. The trigger templates verify the subsequent conditions necessary to ensure that temporal integrity is preserved. Next, the user enters new data or updates existing data in a database management system as shown in Block 106. The method of entry may be performed by computerized means, for example at a personal computer or over a workstation platform. When an insert of new data or an update of existing data is attempted, a time period comparison may be initiated between the attempted data entry or update and the existing temporal data as shown in Block 108. The initiation of a comparison may be in the form of triggers within the database system that execute automatically when an attempt is made. Once an initiation is commenced, user-defined functions operate, to perform the actual comparisons of time period start dates and end dates. This is shown in Block 110. After the time period comparisons are performed, the system disallows an attempted insert or update if temporal integrity is to be violated. This is shown in Block 112.

Figure 2:
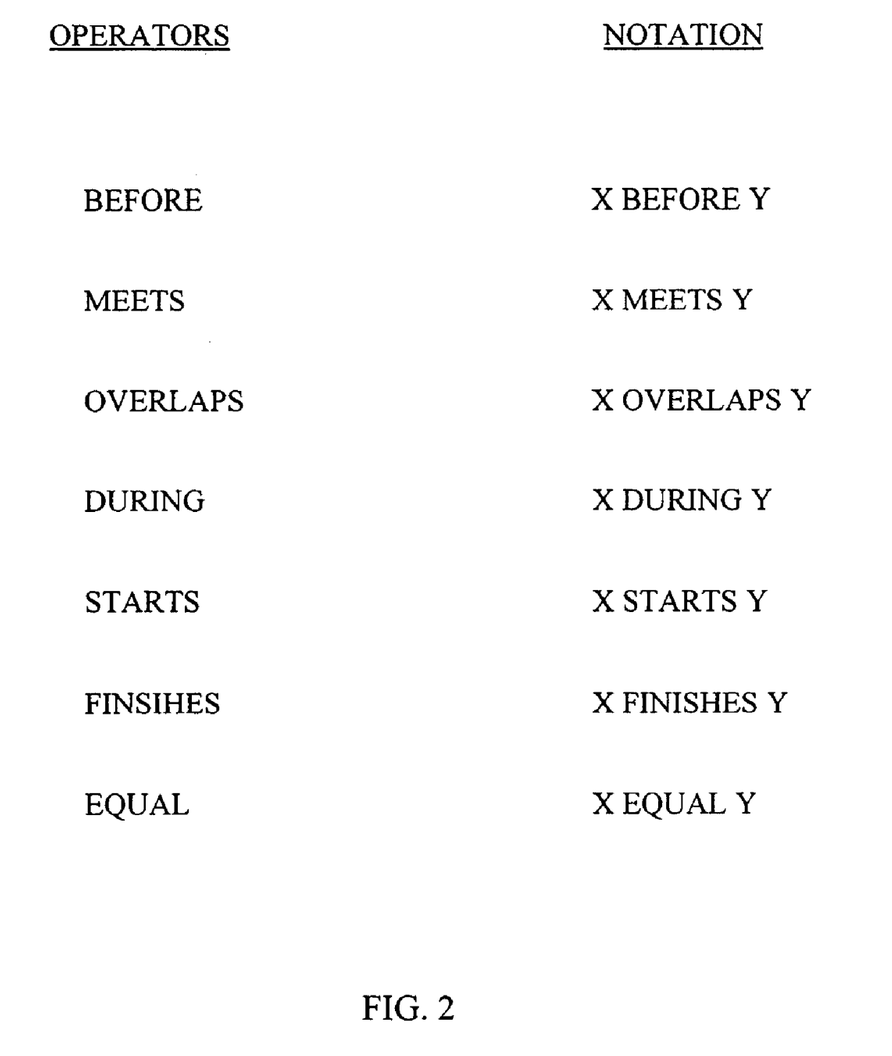
FIG. 2 is a table of common operators that may be used in conjunction with one aspect of the present invention.

The triggers utilize user-defined functions to test for whether a time period shares a time component with another time period. The user-defined functions utilize several operators. Among these operators are those listed in FIG. 2. These operators, known collectively as Allen's operators, determine the appropriate logic function to be performed in the time period comparison by the user-defined function. For example, they perform comparisons between the start dates to determine if time periods meet, overlap, or equal each other. These operators, and others described herein, operate with the user-defined functions when triggered by an attempted insert of new data or update of existing data.

One of the user-defined functions, the SHARES function, is used by each of the triggers to determine whether a time period shares a time component with another time period. The SHARES function is described separately in a co-pending patent application by the same inventor herewith filed Jan. 28, 2000 and entitled Technique For Detecting A Shared Temporal Relationship Of Valid Time Data In A Relational Database Management System. The serial number of this co-pending patent application is, 09/494,325; Its description is incorporated herein by reference.

Other operators which may be used by the user-defined functions include WITHIN, SHARES, MERGES, INTERSECT and UNION. The WITHIN operator returns a true output if time period X is wholly or partly contained within time period Y. It combines the EQUAL, DURING, STARTS, and FINISHES operators into one operator. The SHARES operator returns a true output if time period X shares a time component with time period Y. Like WITHIN, it combines the EQUAL, DURING, STARTS, and FINISHES operators into one, and further adds X OVERLAPS Y and Y OVERLAPS X. The MERGES operator returns true if time period X MEETS or SHARES a time component with time period Y. The INTERSECT operator returns the maximum (latest) start date and minimum (earliest) end date of two time periods if time period X SHARES a time component with time period Y. The UNION operator returns the minimum (earliest) start date and the maximum (latest) end date of two time periods if these time period MEET or SHARE a time component.

In one preferred embodiment, each trigger is coded to raise a different SQLSTATE error and disallow attempted changes that would violate temporal uniqueness. However, users can modify this behavior of the trigger-based logic, if desired. This may be accomplished by altering the method in which the database management system operates when an attempt is disallowed. For example, the DBMS could be programmed to override the system if a user was not concerned with temporal integrity by disabling the trigger templates. A user may also wish to bypass the entire system of the present invention to disable the behavior of the triggers when entering new data or updating existing data in a data object. Another method involves formulating relational operations either interactively, in batch files, or embedded in a host language. The SQL interface therefore provides operators that allow users to manipulate data and modify the performance of the system.

The trigger-based logic is coded into several routines. One routine supports INSERT row instructions while other routines support UPDATE row instructions. The INSERT trigger routine tests for a match between the primary key of the new row and primary key values of the existing rows. Furthermore, it uses the SHARES function to check if the time period on the new row shares any time in common with time periods already in existing rows that have the same primary key value. If one or more rows exist in the data object that would cause both these tests to evaluate as true, a SQLSTATE error (e.g., SQLSTATE 70100) is raised.

In a DBMS that supports temporal data, the primary key signifies data values that should be unique in a data object over time. If a user attempts to insert new data into the data object, the INSERT trigger begins by comparing the new primary key value with existing primary key values. If a match is found, the trigger initiates additional routines for testing the period start and end dates associated with the new primary key value to ensure that there is no time shared with the start and end dates of any existing data in the data object that contains the same primary key value. If this condition were to occur, it would violate temporal uniqueness and the INSERT trigger would raise an error condition to prevent the INSERT operation from proceeding.

The UPDATE trigger routines test for a unique type of temporal change that might be expressed in the updated row, and could lead to a temporal integrity violation. A preferred embodiment of the present invention may include several UPDATE triggers testing for different conditions. These are listed in FIGS. 4 and 5. Another preferred embodiment includes a single UPDATE trigger consolidating all testing conditions. Consolidation adds complexity to developing, debugging, and maintaining such a trigger.

Figure 4:
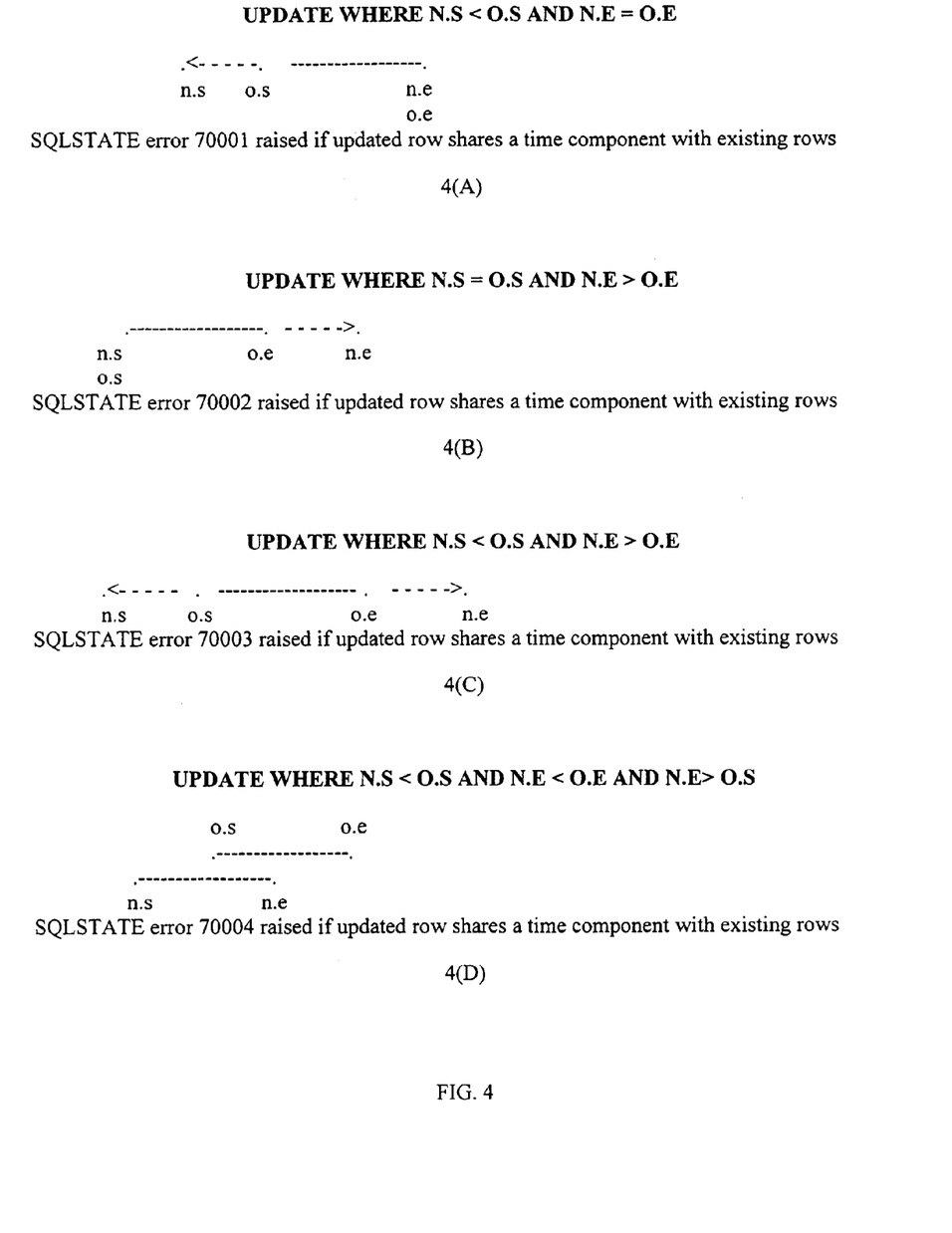
FIG. 4, consisting of FIGS. 4(A), 4(B), 4(C) and 4(D), show update trigger scenarios illustrating conditions by which the present invention operates within the database management system environment.
Figure 5:
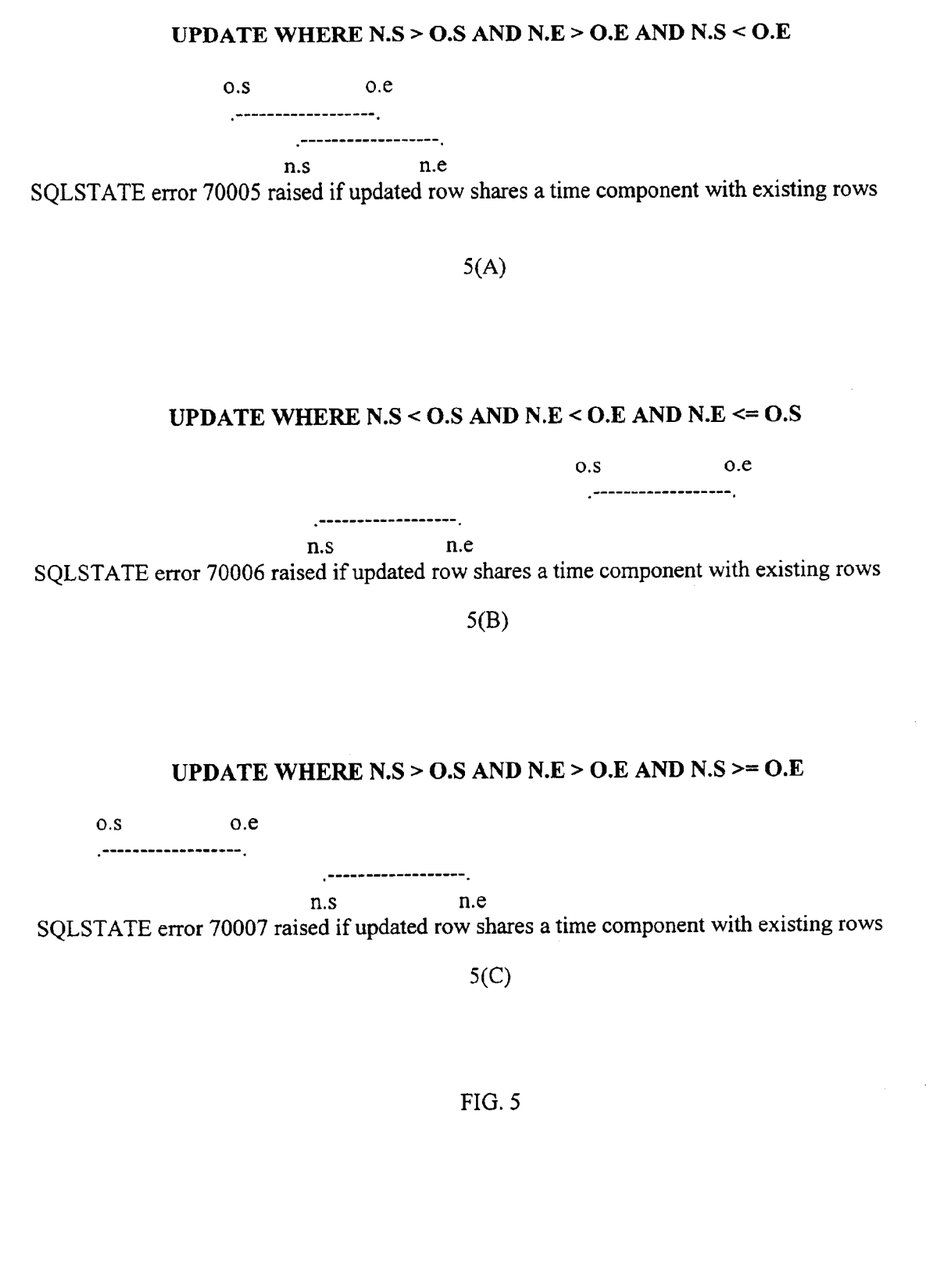
FIG. 5, consisting of FIGS. 5(A), 5(B) and 5(C), are a continuation of the triggers of FIG. 4, showing additional update trigger scenarios which may occur within the present invention.

FIGS. 4 and 5, consisting of FIGS. 4(A), 4(B), 4(C) and 4(D), as well as 5(A), 5(B), and 5(C), list the several types of temporal updates which might be expressed in the updated row that could result in integrity violations. Each sub-figure illustrates a different type of update that would trigger a comparison of data. Each such BEFORE UPDATE trigger provided in the software of the preferred embodiment of the present invention is described in FIGS. 4 and 5. For each description, "n" is a variable referring to the new version of the updated row and "o" is a variable referring to the old version of the row being updated. In addition, "'s" refers to the column name containing the start date of the period and "e" refers to the column name containing the end of the period.

Another kind of update attempt that involves the primary key can potentially cause temporal uniqueness to be violated. This involves non-temporal data in the primary key column. Additional trigger logic is provided for updates of non-temporal primary key data such that if an updated row shares a time component with the existing rows in the data object that have the same primary key values, SQLSTATE 70008 is raised.

Figure 3:
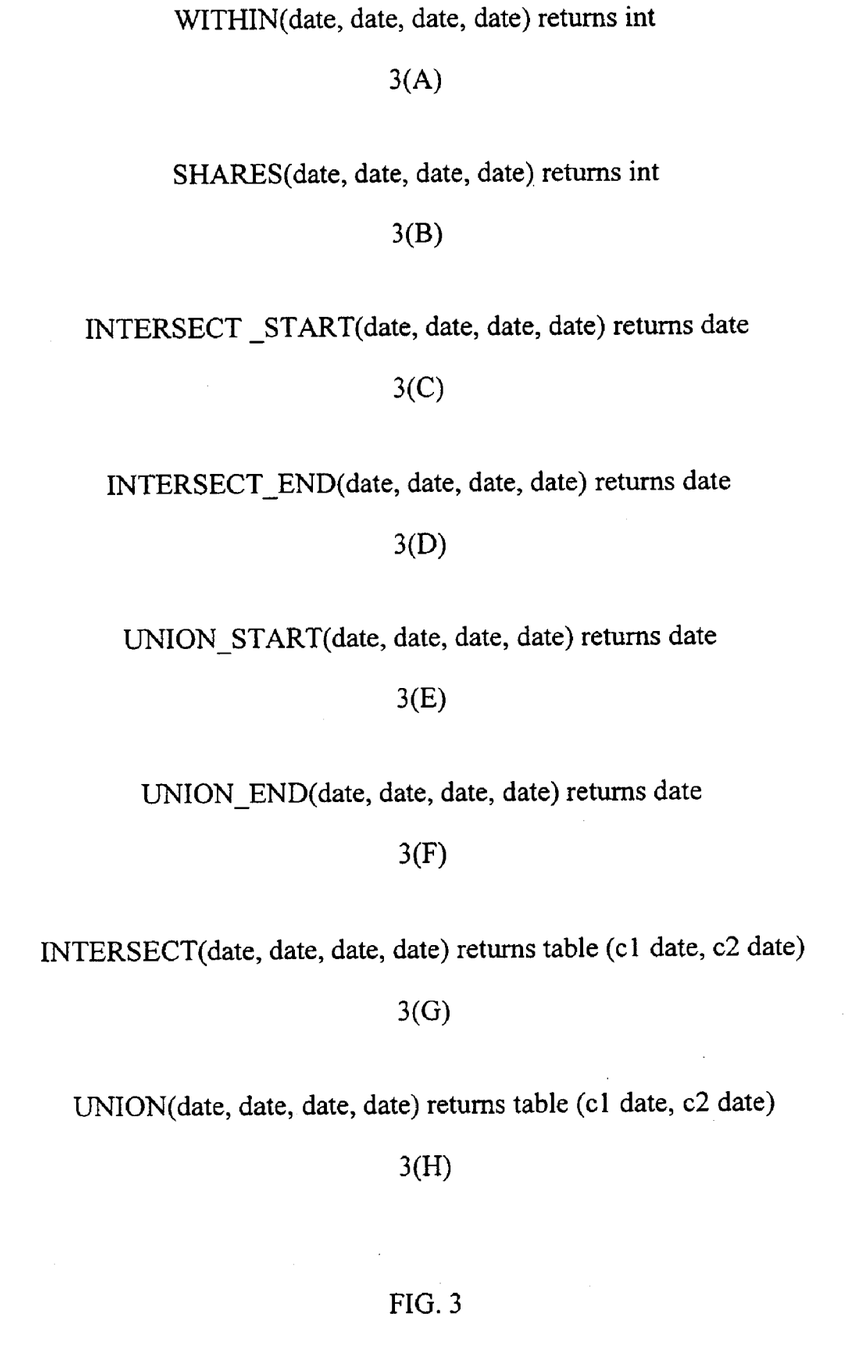
FIG. 3 is a table of user-defined functions that may be used in conjunction with one aspect of the present invention.

Other user-defined functions may also be combined with triggers to determine whether various temporal conditions are valid, such as whether one time period shares a time component with another time period. Examples of these user-defined functions are listed in the table in FIG. 3. Referring to FIG. 3(A), the WITHIN function is satisfied if period 1 is DURING, STARTS, FINISHES, or EQUAL period 2. The specific logical implementation of this function is: if date1>=date3 AND date2<=date4, return 1; else return 0. In FIG. 3(B), the SHARES function is satisfied if period 1 EQUAL, OVERLAP, STARTS, FINISHES, or DURING period 2, or period 2 OVERLAP, STARTS, FINISHES, or DURING period 1. The specific logical implementation of this function is: if (date1<date4 AND date3<date2) or (date1=date3 AND date2=date4) return 1; else return 0.

In FIG. 3(C), the INTERSECT_START function is satisfied if the periods SHARE a time component. If they do, the function returns the start date of the intersection of these periods (maximum of date1, date3). Otherwise, it returns null. The INTERSECT_END function in FIG. 3(D) is also satisfied if the periods SHARE a time component. If they do, the function returns the end date of the intersection of these periods (minimum of date2, date4). Otherwise, it returns null.

The UNION_START function as described in FIG. 3(E) is satisfied if the periods SHARE a time component or if the periods MEET. The function returns the start date of the union of these periods (minimum of date1, date3) if the condition is satisfied. Otherwise, it returns null. In FIG. 3(F), the UNION_END function is satisfied if the periods SHARE a component or if the periods MEET. The function returns the end date of the union of these periods (maximum of date2, date 4) if the condition is satisfied. Otherwise, it returns null.

The INTERSECT function in FIG. 3(G) is satisfied if the periods SHARE a time component, and returns the start and end dates of the intersection of these periods (maximum of date1, date3 and minimum of date2, date4). Otherwise, it returns null. In FIG. 3(H), the UNION function is satisfied if the periods SHARE a time component or if the periods MEET. In this case the function returns the start and end dates of the union of these periods (minimum of date1, date3 and maximum of date2, date4). Otherwise, it returns null.

The CHECK constraint software routine is useful for both temporal uniqueness as well as general data integrity. It tests whether the starting or beginning point or date of a period is less than the ending point or date of a period. In addition, the columns considered to constitute the temporal primary key must be defined as NOT NULL. If defined otherwise, temporal uniqueness cannot be guaranteed. Primary key data is data used to signify the beginning of a time period. The CHECK constraint and the trigger functions use the primary key for determining where to begin a comparison of time period data starting and ending points.

In another preferred embodiment of the present invention, the system can be packaged into a DBMS extender for users to plug into existing DBMS environments. The extender includes the system and method of enforcing temporal data. Users desiring to enforce temporal data in their respective system environments can therefore utilize the system or method manually or choose to utilize the packaged system extender for accomplishing temporal integrity.

The foregoing description of the preferred embodiments of the invention have been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for enforcing temporal data uniqueness in a database management system having data structures defined by a primary id key and an associated temporal key, comprising the following steps:
   (a) analyzing each database command attempting insertion of a temporal key;
   (b) testing for a possible temporal data uniqueness violation by comparing the command temporal key and the exiting database data structure temporal key, determining the exact nature of the violation and returning a unique violation identifier; and
   (c) enforcing the temporal data uniqueness by disallowing the command or overriding the violation.

2. The method according to claim 1, wherein the database management system is object or relational and having a plurality of columns, and wherein the command attempting an insertion of a new data structure having identical primarily id key as an existing data structure and sharing the associated temporal key, or attempting an update of a column of an existing data structure, said column defining a temporal key or primarily id key, the existing data structure sharing the associated temporal key with the command.

3. The method according to claim 2, wherein the data structure is a data object.

4. The method according to claim 1, further comprising a step of verifying validity of the command's temporal key, having a start temporal key and an end temporal key, wherein said step comprising a step of verifying that the start temporal key representing time beginning before the end temporal key, and a step verifying that the temporal key being defined as having NOT NULL key values.

5. The method according to claim 1, wherein the temporal key having a start temporal key and an end temporal key representing a time period, said representation of the database temporal key being chosen from a group comprising a timestamp representation, a date-time representation, a quarterly and annual representation.

6. The method according to claim 1, wherein the step of enforcing the temporal data uniqueness including a step of disallowing execution of the command.

7. The method according to claim 1, wherein the step of enforcing the temporal data uniqueness including a step of overriding the temporal data uniqueness violation by a user-defined function.

8. The method according to claim 1, wherein the command violating the temporal data uniqueness by attempting an insertion of a new data structure having the same primary id key and sharing any component of the associated temporal key of an existing database data structure, wherein the temporal key component including the start temporal key and the end temporal key.

9. The method according to claim 1, wherein the command violating the temporal data uniqueness by attempting an update of an existing database data structure having the same primary id key and sharing any component of the associated temporal key of an existing database data structure, wherein the temporal key component including the start temporal key and the end temporal key.

10. The method according to claim 1, wherein the possible temporal data uniqueness violation being determined by a set of trigger functions comparing the command temporal key and the existing database data structure temporal key, determining the exact nature of the violation and returning a unique violation identifier.

11. The method according to claim 10, wherein the trigger functions using temporal comparison operators chosen from a group comprising EQUAL, OVERLAPS, MEETS, BEFORE, DURING, STARTS, FINISHES, SHARES, MERGES, WITHIN, INTERSECTION, and UNION.

12. A system for enforcing temporal data uniqueness in a database management system having data structures defined by a primary id key and an associated temporal key, comprising:
   computer-based means for analyzing each database command attempting insertion of a temporal key;
   computer-based means for testing for a possible temporal data uniqueness violation by comparing the command temporal key and the existing database data structure temporal key, determining the exact nature of the violation and returning a unique violation identifier; and
   computer-based means for enforcing the temporal data uniqueness by allowing the command or overriding the violation.

13. The system according to claim 12, wherein the database management system is object or relational and having a plurality of columns, and wherein the command attempting an insertion of a new data structure having identical primary id key as an existing data structure and sharing the associated temporal key, or attempting an update of a column of an existing data structure, said column defining a temporal key or a primary id key, the existing data structure sharing the associated temporal key with the command.

14. The system according to claim 13, wherein the data structure is a data object.

15. The system according to claim 12, farther comprising a means for verifying validity of the command's temporal key, having a start temporal key and an end temporal key, wherein said means comprising a means for verifying that the start temporal key representing, time beginning before the end temporal key, and a means verifying that the temporal key being defined as having NOT NULL key values.

16. The system according to claim 12, wherein the temporal key having a start temporal key and an end temporal key representing a time period, said representation of the database temporal key being chosen from a group comprising a timestamp representation, a date-time representation, a quarterly and annual representation.

17. The system according to claim 12, wherein the means for enforcing the temporal data uniqueness including a means for disallowing execution of the command.

18. The system according to claim 12, wherein the means for enforcing the temporal data uniqueness including a means for overriding the temporal data uniqueness violation by a user-defined function.

19. The system according to claim 12, wherein the command violating the temporal data uniqueness by attempting an insertion of a new data structure having the same primary id key and sharing any component of the associated temporal key of an existing database data structure, wherein the temporal key component including the start temporal key and the end temporal key.

20. The system according to claim 12, wherein the command violating the temporal data uniqueness by attempting an update of an existing database data structure having the same primary id key and sharing any component of the associated temporal key of an existing database data structure, wherein the temporal key component including the start temporal key and the end temporal key.

21. The system according to claim 12, wherein the possible temporal data uniqueness violation being determined by a set of trigger functions comparing the command temporal key and the existing database data structure temporal key, determining the exact nature of the violation and returning a unique violation identifier.

22. The system according to claim 21, wherein the trigger functions using temporal comparison operators chosen from a group comprising EQUAL, OVERLAPS, MEETS, BEFORE, DURING, STARTS, FINISHES, SHARES, MERGES, WITHIN, INTERSECTION, and UNION.

23. A computer usable medium tangibly embodying a program of instructions executable by the computer to perform a computer-based method for enforcing temporal data uniqueness in a database management system having data structures defined by a primary id key and an associated temporal key, comprising the following steps:

(a) analyzing each database command attempting insertion of a temporal key;

(b) testing for a possible temporal data uniqueness violation by comparing the command temporal key and the existing database data structure temporal key, determining the exact nature of the violation and returning a unique violation identifier; and (c) enforcing the temporal data uniqueness by disallowing the command or overriding the violation.

24. The method according to claim 23, wherein the database management system is object or relational and having a plurality of columns, and wherein the command attempting an insertion of a new data structure having identical primary id key as an existing data structure and sharing the associated temporal key, or attempting an update of a column of an existing data structure, said column defining a temporal key or a primary id key, the existing data structure sharing the associated temporal key with the command.

25. The method according to claim 24, wherein the data structure is a data object.

26. The method according to claim 23, farther comprising a step of verifying validity of the command's temporal key, having a start temporal key and an end temporal key, wherein said step comprising a step of verifying that the start temporal key representing time beginning before the end temporal key, and a step verifying that the temporal key being defined as having NOT NULL key values.

27. The method according to claim 23, wherein the temporal key having a start temporal key and an end temporal key representing a time period, said representation of the database temporal key being chosen from a group comprising a timestamp representation, a date-time representation, a quarterly and annual representation.

28. The method according to claim 23, wherein the step of enforcing the temporal data uniqueness including a step of disallowing execution of the command.

29. The method according to claim 23, wherein the step of enforcing the temporal data uniqueness including a step of overriding the temporal data uniqueness violation by a user-defined function.

30. The method according to claim 23, wherein the command violating the temporal data uniqueness by attempting an insertion of a new data structure having the same primary id key and sharing any component of the associated temporal key of an existing database data structure, wherein the temporal key component including the start temporal key and the end temporal key.

31. The method according to claim 23, wherein the command violating the temporal data uniqueness by attempting an update of an existing database data structure having the same primary id key and sharing any component of the associated temporal key of an existing database data structure, wherein the temporal key component including the start temporal key and the end temporal key.

32. The method according to claim 23, wherein the possible temporal data uniqueness violation being determined by a set of trigger functions comparing the command temporal key and the existing database data structure temporal key, determining the exact nature of the violation and returning a unique violation identifier.

33. The method according to claim 32, wherein the trigger functions using temporal comparison operators chosen from a group comprising EQUAL, OVERLAPS, MEETS, BEFORE, DURING, STARTS, FINISHES, SHARES, MERGES, WITHIN, INTERSECTION, and UNION.

* * * * *